United States Patent
Luce et al.

(10) Patent No.: US 10,612,617 B2
(45) Date of Patent: Apr. 7, 2020

(54) SHOCK STRUT PERCOLATION

(71) Applicant: GOODRICH CORPORATION, Charlotte, NC (US)

(72) Inventors: William E. Luce, Colleyville, TX (US); Alvin Fong, Oakville (CA)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/860,366

(22) Filed: Jan. 2, 2018

(65) Prior Publication Data
US 2019/0203796 A1   Jul. 4, 2019

(51) Int. Cl.
*F16F 9/06* (2006.01)
*F16F 9/342* (2006.01)
*F16F 9/48* (2006.01)
*B64C 25/60* (2006.01)

(52) U.S. Cl.
CPC .............. *F16F 9/066* (2013.01); *B64C 25/60* (2013.01); *F16F 9/061* (2013.01); *F16F 9/342* (2013.01); *F16F 9/486* (2013.01); *F16F 2222/12* (2013.01); *F16F 2226/04* (2013.01)

(58) Field of Classification Search
CPC .. F16F 9/066; F16F 9/061; F16F 9/342; F16F 9/486; F16F 2222/12; F16F 2226/04; B64C 25/60
USPC ........... 188/269, 284, 313; 267/64.12, 64.18, 267/64.26; 244/104 FP
See application file for complete search history.

(56) References Cited

U.S. PATENT DOCUMENTS

| | | | | |
|---|---|---|---|---|
| 3,292,919 A | * | 12/1966 | Lindley | B64C 25/60 188/289 |
| 3,888,436 A | * | 6/1975 | Sealey | B64C 25/60 188/284 |
| 4,405,119 A | * | 9/1983 | Masclet | B60G 15/12 188/288 |
| 4,907,760 A | * | 3/1990 | Sealey | B64C 25/60 244/100 R |
| 5,310,140 A | * | 5/1994 | Veaux | B64C 25/001 244/104 FP |
| 5,458,219 A | | 10/1995 | Anderson | |
| 8,459,417 B2 | | 6/2013 | Masson et al. | |
| 9,541,151 B2 | | 1/2017 | Martin et al. | |
| 2016/0017953 A1 | * | 1/2016 | Lee | B64C 25/60 188/297 |

FOREIGN PATENT DOCUMENTS

| | | |
|---|---|---|
| BE | 673859 | 6/1966 |
| DE | 2338035 | 2/1974 |
| GB | 2057629 | 4/1981 |

OTHER PUBLICATIONS

European Patent Office, European Search Report dated May 21, 2019 in Application No. 19150102.2.

* cited by examiner

*Primary Examiner* — Pamela Rodriguez
(74) *Attorney, Agent, or Firm* — Snell & Wilmer, LL.P.

(57) ABSTRACT

A shock strut may comprise an orifice plate comprising a metering pin aperture and a percolation aperture. The percolation aperture may be configured to allow a gas to move from a first chamber to a second chamber in response to the shock strut moving from a retracted position to a deployed position.

18 Claims, 4 Drawing Sheets

SHOCK STRUT PERCOLATION

FIELD

The present disclosure relates to shock struts, and more particularly, to systems and methods for shock strut damping.

BACKGROUND

Shock struts with mixed air/oil chambers may typically have a dynamic liquid damping chamber separated from a mixed air/oil chamber by a metering orifice. A shock strut may have gas in the main damping chamber when retracted. It is beneficial in operation if substantially no gas is in the dynamic liquid damping chamber below the metering orifice.

SUMMARY

An orifice plate for a shock strut is disclosed, comprising a metering pin aperture extending through the orifice plate, and a percolation aperture extending through the orifice plate, wherein the orifice plate comprises an annular geometry defined by a first axially facing surface, a second axially facing surface disposed opposite the orifice plate from the first axially facing surface, an inner diameter surface, and an outer diameter surface, wherein the metering pin aperture is defined by the inner diameter surface.

In various embodiments, the metering pin aperture is configured to receive a metering pin.

In various embodiments, a cross-sectional area of the percolation aperture is less than that of a metering area defined between inner diameter surface and the metering pin.

In various embodiments, the orifice plate is configured to separate a first chamber of the shock strut from a second chamber of the shock strut.

In various embodiments, the orifice plate further comprises a percolation tube extending from the percolation aperture.

In various embodiments, the percolation aperture is radially offset from the metering pin aperture.

A shock strut is disclosed, comprising a strut cylinder, a strut piston at least partially disposed within the strut cylinder, an orifice plate comprising a metering pin aperture and a percolation aperture, and a metering pin configured to extend through the metering pin aperture, wherein the metering pin and the orifice plate define at least one metering groove through which a fluid flows in response to the strut piston translating relative to the strut cylinder.

In various embodiments, the fluid flows through the percolation aperture in response to the strut piston translating relative to the strut cylinder.

In various embodiments, the percolation aperture is disposed in an upper half of the orifice plate in response to the shock strut being in a retracted position.

In various embodiments, the orifice plate comprises an annular geometry defined by a first axially facing surface, a second axially facing surface disposed opposite the orifice plate from the first axially facing surface, an inner diameter surface, and an outer diameter surface, wherein the metering pin aperture is defined by the inner diameter surface.

In various embodiments, the percolation aperture is disposed between the metering pin aperture and the outer diameter surface.

In various embodiments, the shock strut further comprises a percolation tube extending from the percolation aperture.

In various embodiments, the percolation tube extends into a mixed fluid chamber of the shock strut.

In various embodiments, a cross-sectional area of the percolation aperture is less than that of the at least one metering groove when the shock strut is in a fully extended position.

In various embodiments, a cross-sectional area of the percolation aperture is between five percent and fifty percent of that of the at least one metering groove when the shock strut is in a fully extended position.

In various embodiments, the percolation aperture is configured to allow a gas to move from a first chamber to a second chamber in response to the shock strut moving from a retracted position to a deployed position, wherein the first chamber is located opposite the orifice plate from the second chamber.

A method for manufacturing an orifice plate is disclosed, comprising forming a metering pin aperture into the orifice plate, and forming a percolation aperture into the orifice plate.

In various embodiments, the method further comprises coupling a percolation tube to the orifice plate.

In various embodiments, the orifice plate comprises an annular geometry defined by a first axially facing surface, a second axially facing surface disposed opposite the orifice plate from the first axially facing surface, an inner diameter surface, and an outer diameter surface, wherein the metering pin aperture is defined by the inner diameter surface.

In various embodiments, the percolation aperture is disposed between the metering pin aperture and the outer diameter surface.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Shock struts with mixed air/oil chambers may typically have a dynamic liquid damping chamber (e.g., lower chamber) separated from a mixed air/oil chamber (e.g., upper chamber) by a metering orifice. Gas is known to leak into the lower chamber when the shock strut is in the retracted position. As the shock strut is moved to an extended position, such as in preparation for a landing event for example, gas may begin to move back into the upper chamber. The shock strut may be configured to work most efficiently with the lower chamber devoid of any gas. Thus, if there is still gas in the lower chamber during the landing event, the shock strut may not perform at the highest efficiency.

A shock strut, as disclosed herein, may include a percolation tube extending between a first lower chamber and a second upper chamber of the shock strut. The first chamber may be most efficient when filled with a liquid. When retracted, the shock strut may be in a horizontal position, allowing gas to enter the first chamber. When deployed, or extended, liquid may again enter the first chamber from the second chamber and the gas may escape from the first chamber into the second chamber. Movement of the fluid from the second chamber to the first chamber, as well as gas from the first chamber to the second chamber, may be referred to herein as percolation. Addition of a percolation tube in the proximity of the shock strut main metering orifice (metering orifice may be created by use of grooves along the side of a metering pin) may create a flow pattern to speed up the percolation process. This extra passage may be in the form of a tube having its entrance at the same axial location as the main metering orifice, but its exit is at a higher axial location than the orifice with its orientation being at a higher elevation than the main orifice when the strut is retracted. A shock strut, as disclosed herein, may ensure that gas flows up the percolation tube, allowing oil to more quickly flow down through the main metering orifice(s).

Figure 1:
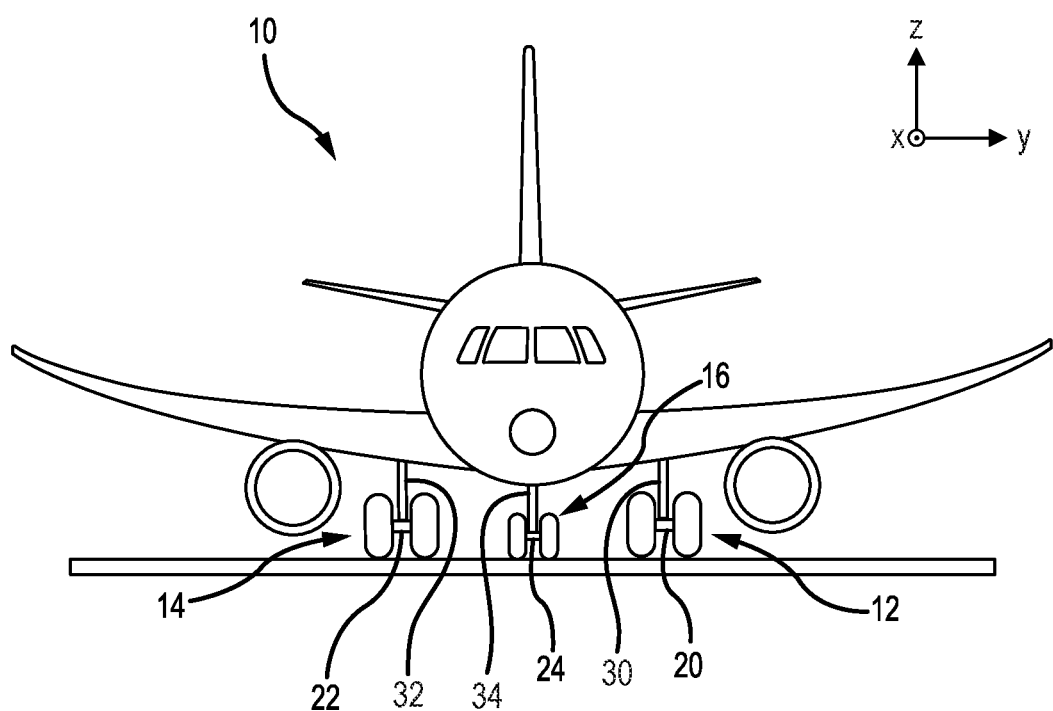
FIG. 1 illustrates an aircraft, in accordance with various embodiments.

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft 10 is not flying, allowing aircraft 10 to taxi, take off and land without damage. Landing gear 12 may include shock strut 30 and wheel assembly 20. Landing gear 14 may include shock strut 32 and wheel assembly 22. Landing gear 16 may include shock strut 34 and nose wheel assembly 24.

Figure 2A:
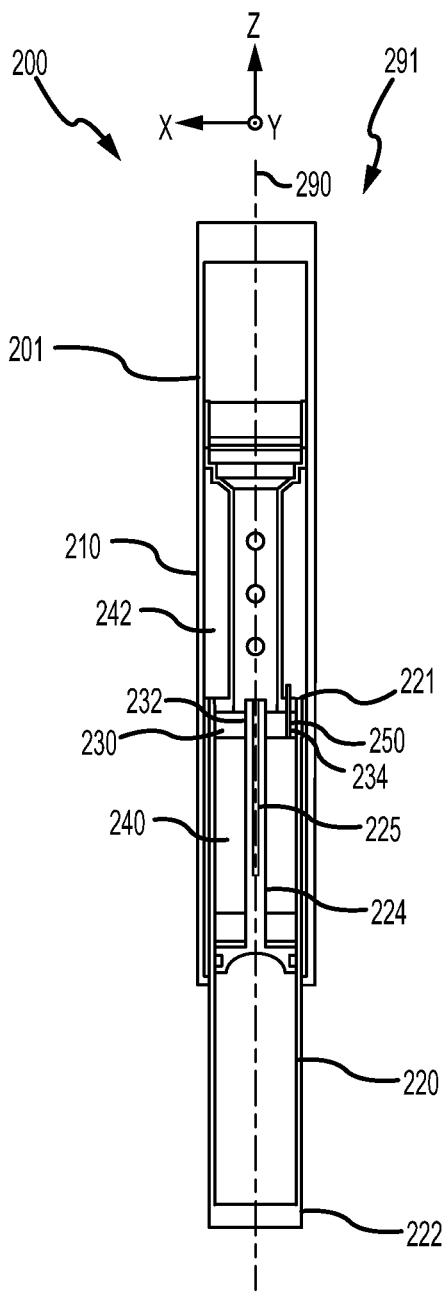
FIG. 2A illustrates a schematic view of a landing gear arrangement in an extended position, in accordance with various embodiments.
Figure 2B:
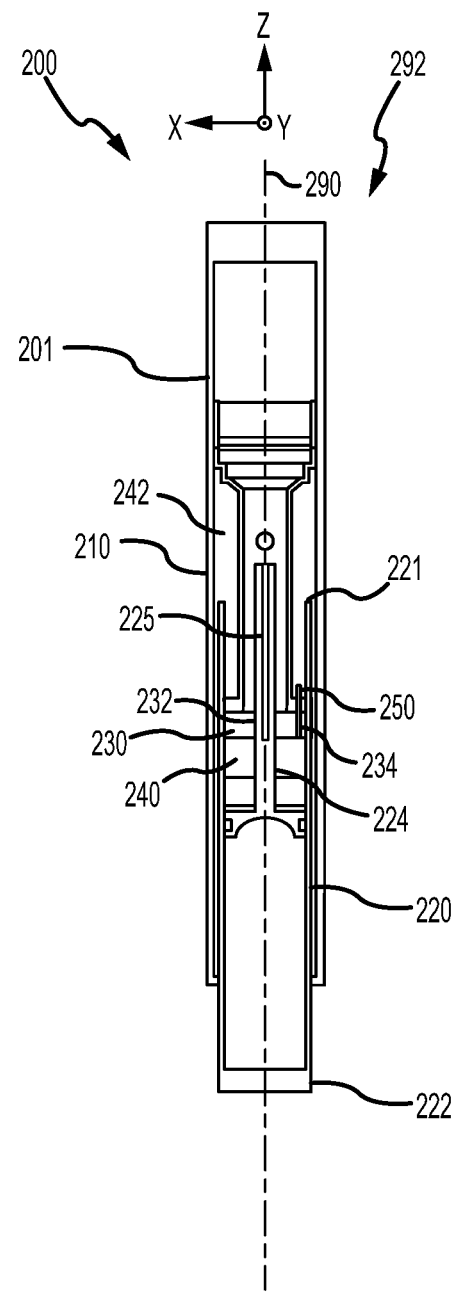
FIG. 2B illustrates a schematic view of the landing gear arrangement of FIG. 2A in a compressed position, in accordance with various embodiments.

With reference to FIG. 2A and FIG. 2B, a landing gear arrangement 200 is illustrated, in accordance with various embodiments. Landing gear 12 and landing gear 14 of FIG. 1 may be similar to landing gear arrangement 200. Landing gear arrangement 200 may comprise a shock strut 201. Shock strut 201 may comprise a strut cylinder 210 and a strut piston 220. Strut piston 220 may be operatively coupled to strut cylinder 210. Strut piston 220 may comprise a first end 221 disposed within strut cylinder 210 and a second end 222 extending from strut cylinder 210. Strut cylinder 210 may be configured to receive strut piston 220 in a manner that allows the two components to telescope together and absorb and dampen forces transmitted thereto. FIG. 2A illustrates shock strut 201 in an extended position 291. FIG. 2B illustrates shock strut 201 in a compressed position 292.

In various embodiments, shock strut 201 may comprise an orifice plate 230. In various embodiments, a liquid, such as a hydraulic fluid and/or oil may be located within strut cylinder 210. Further, a gas, such as nitrogen or air, may be located within strut cylinder 210. Strut cylinder 210 and strut piston 220 may, for example, be configured to seal such that fluid contained within strut cylinder 210 is prevented from leaking as strut piston 220 translates relative to strut cylinder 210. Orifice plate 230 may separate a first chamber (also referred to herein as a dynamic liquid chamber 240 from a second chamber (also referred to herein as a mixed fluid chamber) 242. In this regard, during operation, a liquid, such as a hydraulic fluid and/or oil may be located within dynamic liquid chamber 240 and a mixture of a gas, such as nitrogen or air, and the liquid may be located within mixed fluid chamber 242.

In various embodiments, shock strut 201 may comprise a metering pin 224. Metering pin 224 may be coupled to strut piston 220. Metering pin 224 may translate with strut piston 220. Metering pin 224 may be received by orifice plate 230. In this regard, orifice plate 230 may comprise a metering pin aperture 232. Metering pin 224 may be received by metering pin aperture 232. Metering pin 224 may extend through orifice plate 230. Metering pin 224 may comprise one or more metering grooves 225 disposed along the length (along the Z-direction) of metering pin 224. As described herein, metering groove 225 and orifice plate 230 may define a flow channel through which liquid may travel from dynamic liquid chamber 240 to mixed fluid chamber 242 in response to shock strut 201 moving to a compressed position, such as compressed position 292 for example.

In various embodiments, a percolation aperture 234 may be disposed in orifice plate 230. Percolation aperture 234 may be in fluid communication with dynamic liquid chamber 240. Percolation aperture 234 may be in fluid communication with mixed fluid chamber 242. In various embodiments, shock strut 201 may further include a percolation tube 250. Percolation tube 250 may extend from percolation aperture 234. Stated differently, Percolation tube 250 may extend from orifice plate 230. Percolation tube 250 may be configured to allow gas to escape from dynamic liquid chamber 240 into mixed fluid chamber 242 in response to shock strut 201 moving from a retracted position to a deployed position.

In various embodiments, strut piston 220 and strut cylinder 210 may extend along centerline axis 290. In various embodiments, metering pin 224 may be concentric with strut piston 220. In various embodiments, orifice plate 230 may be concentric with strut cylinder 210.

Figure 3A:
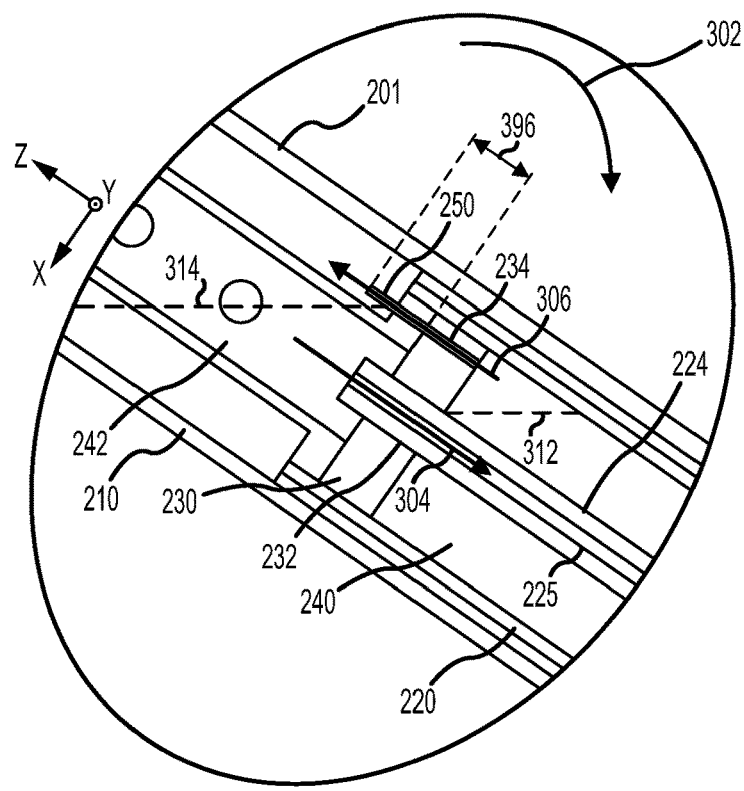
FIG. 3A illustrates a schematic view of a portion of a shock strut rotating from a retracted position to a deployed position, in accordance with various embodiments.

With reference to FIG. 3A, a portion of shock strut 201 moving from a retracted position to a deployed position is illustrated, in accordance with various embodiments. In the retracted position, shock strut 201 may be oriented substantially horizontal. In this regard, gravity may cause gas to travel from mixed fluid chamber 242 into dynamic liquid chamber 240 when shock strut 201 is in the retracted position. As shock strut 201 moves (see arrow 302) from the retracted position to the deployed position, gravity may cause liquid in mixed fluid chamber 242 to move into dynamic liquid chamber 240. In various embodiments, shock strut 201 may rotate (e.g., about the Y-axis) as shock strut 201 moves from the retracted position to the deployed position. In the illustrated embodiment, liquid is illustrated below fluid level line 314, with gas being located above fluid level line 314 in mixed fluid chamber 242. Similarly, liquid is illustrated below fluid level line 312, with gas being located above fluid level line 312 in dynamic liquid chamber 240.

In various embodiments, as shock strut 201 rotates from the retracted position (e.g., substantially horizontal) to the deployed position (e.g., substantially vertical), a flow path (also referred to herein as a gas flow path) 306 may form through percolation tube 250, allowing gas to travel from dynamic liquid chamber 240 to mixed fluid chamber 242. A flow path (also referred to herein as a liquid flow path) 304 may form through metering groove 225 (between metering pin 224 and orifice plate 230), allowing fluid to travel from mixed fluid chamber 242 to dynamic liquid chamber 240. Flow path 304 and flow path 306 may exist simultaneously, allowing gas to be more quickly evacuated from dynamic liquid chamber 240. Thus, percolation tube 250 may allow for dynamic liquid chamber 240 to more quickly become ready for a full energy landing (i.e., in response to being filled with liquid) after extending from the retracted position.

Figure 3B:
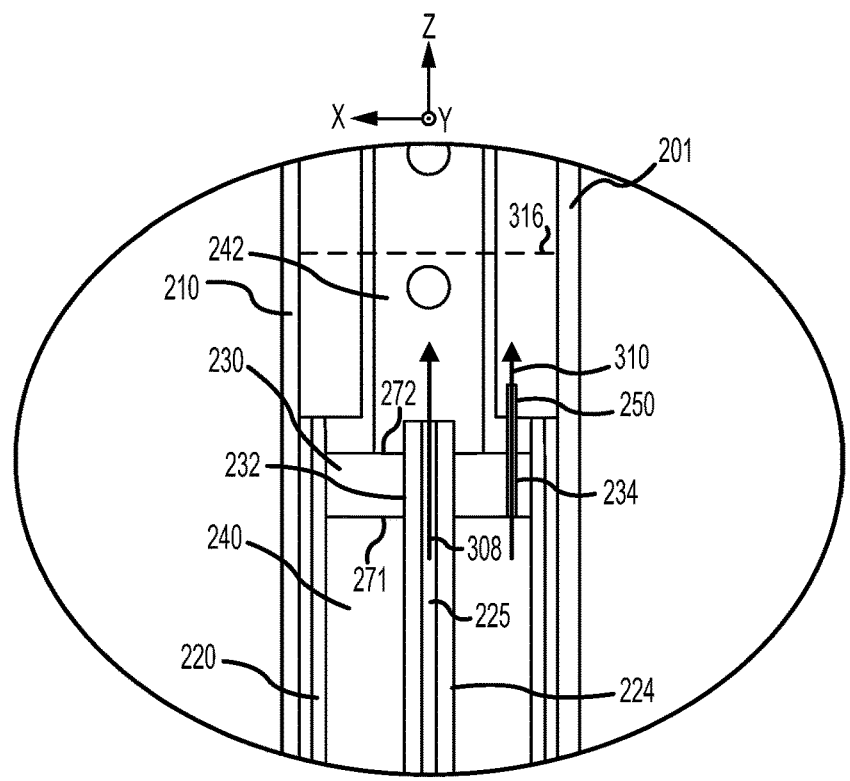
FIG. 3B illustrates a schematic view of the portion of the shock strut of FIG. 3A moving from an extended position to a compressed position, in accordance with various embodiments.

With reference to FIG. 3B, shock strut 201 is illustrated in the deployed position, moving from an extended position, to a compressed position, such as during a landing event for example. As strut piston 220 compresses into strut cylinder 210, the volume of dynamic liquid chamber 240 is reduced, forcing liquid from dynamic liquid chamber 240 into mixed fluid chamber 242. A flow path 308 may be defined by metering pin 224 and orifice plate 230. A flow path 310 may be defined by percolation tube 250. Liquid may be forced from dynamic liquid chamber 240, through metering groove 225 (between metering pin 224 and orifice plate 230), into mixed fluid chamber 242, via flow path 308. Liquid may be forced from dynamic liquid chamber 240, through percolation tube 250, into mixed fluid chamber 242, via flow path 310. Thus, percolation tube 250 may be configured to both allow for gas to escape from dynamic liquid chamber 240 into mixed fluid chamber 242 and to meter the flow of liquid from dynamic liquid chamber 240 into mixed fluid chamber 242. Thus, the cross-sectional area (taken in the X-Y plane) of percolation tube 250 may be taken into account when designing metering groove 225.

In various embodiments, orifice plate 230 may comprise a first axially facing surface 271 and a second axially facing surface 272. Second axially facing surface 272 may be located opposite orifice plate 230 from first axially facing surface 271. In various embodiments, percolation tube 250 may be flush with first axially facing surface 271. In various embodiments, percolation tube 250 may extend from second axially facing surface 272.

With reference to FIG. 3A, percolation tube 250 may extend upwards (positive Z-direction) from orifice plate 230 by a dimension 396. By extending percolation tube 250 into mixed fluid chamber 242, liquid may be prevented from entering percolation tube 250 from mixed fluid chamber 242 while gas travels from dynamic liquid chamber 240 into mixed fluid chamber 242 through percolation tube 250. In various embodiments, dimension 396 may be between one-half inch and twelve inches (1.27 cm-30.48 cm). In various embodiments, dimension 396 may be between one inch and six inches (2.54 cm-15.24 cm). In various embodiments, dimension 396 may be between one inch and four inches (2.54 cm-10.16 cm).

Figure 4:
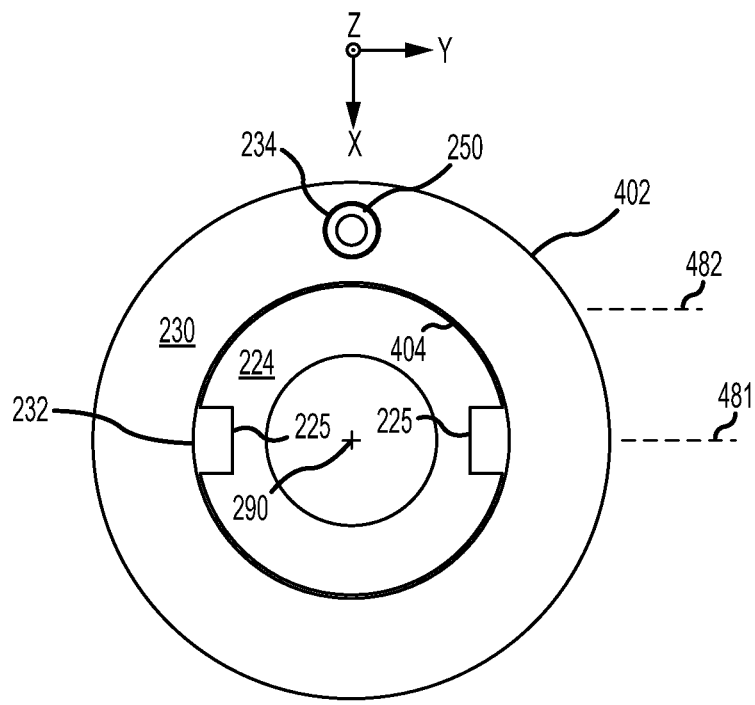
FIG. 4 illustrates a cross-sectional view of an orifice plate, a metering pin, and a percolation tube, in accordance with various embodiments.

With reference to FIG. 4, a cross-section view of an orifice plate 230, metering pin 224, and percolation tube 250 is illustrated, in accordance with various embodiments. In various embodiments, orifice plate 230 may comprise an outer diameter surface 402 and an inner diameter (ID) surface 404. In this regard, orifice plate 230 may comprise an annular geometry. In various embodiments, ID surface 404 may define metering pin aperture 232. Metering pin aperture 232 may be concentric with centerline axis 290. In various embodiments, metering grooves 225 and ID surface 404 of orifice plate 230 may define corresponding flow paths (e.g., flow path 308) through which liquid may travel in response to shock strut 201 being compressed, with momentary reference to FIG. 3B. In various embodiments, the cross-sectional area of metering grooves 225 may vary along the axial direction (Z-direction). For example, the cross-sectional area of metering grooves 225 may decrease along the positive Z-direction. In this regard, a metering area may be defined by the cross-sectional area defined by metering grooves 225 and ID surface 404.

In various embodiments, percolation aperture 234 may be disposed in the upper half of orifice plate 230 (e.g., above line 481, in the negative X-direction) when shock strut 201 is in the retracted position. In various embodiments, percolation aperture 234 may be disposed in the upper fourth of orifice plate 230 (in the negative X-direction) when shock strut 201 is in the retracted position (i.e., located above the halfway point 482 between the centerline axis 290 and outer diameter surface 402. In this regard, percolation aperture 234 may be radially offset from metering pin aperture 232. Percolation tube 250 may engage orifice plate 230 at percolation aperture 234. Percolation tube 250 may be coupled to orifice plate 230 at percolation aperture 234. In various embodiments, percolation tube 250 is threadingly attached to percolation aperture 234.

In various embodiments, a cross-sectional area of percolation aperture 234 may be less than the aggregate cross-sectional area of metering grooves 225 when shock strut 201 is in a fully extended position, with momentary reference to FIG. 2A. In various embodiments, a cross-sectional area of percolation aperture 234 is between five percent and fifty percent of the aggregate cross-sectional area of metering grooves 225 when shock strut 201 is in a fully extended position, with momentary reference to FIG. 2A.

Figure 5:
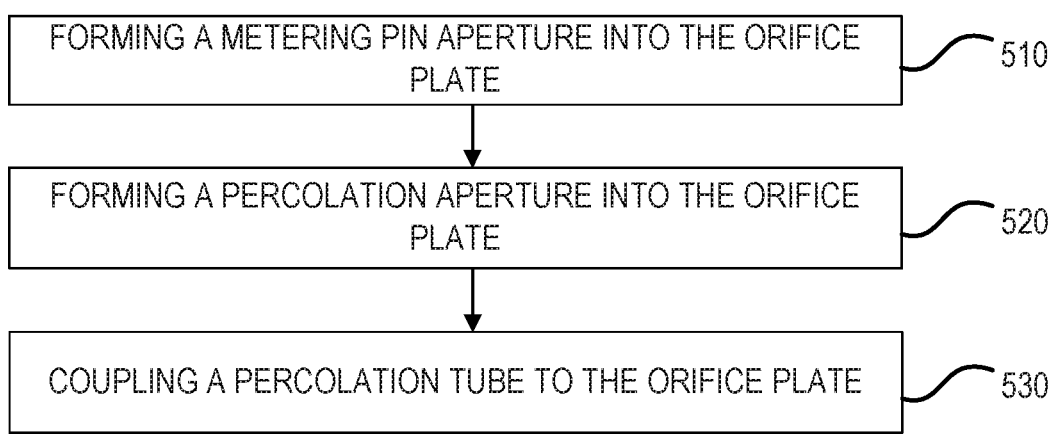
FIG. 5 illustrates a method for manufacturing an orifice plate, in accordance with various embodiments.

With reference to FIG. 5, a method 500 for manufacturing an orifice plate is provided, in accordance with various embodiments. Method 500 includes forming a metering pin aperture into the orifice plate (step 510). Method 500 includes forming a percolation aperture into the orifice plate (step 520). Method 500 may include coupling a percolation tube to the orifice plate (step 530).

With combined reference to FIG. 4 and FIG. 5, step 510 may include forming metering pin aperture 232 into orifice plate 230. Step 520 may include forming percolation aperture 234 into orifice plate 230. Step 510 and step 520 may include drilling, casting, milling, or any other suitable method. Step 530 may include coupling percolation tube 250 to orifice plate 230. Step 530 may include rotating percolation tube 250 into percolation aperture 234 to threadingly attach percolation tube 250 to orifice plate 230. Step 530 may include pressing percolation tube 250 into percolation aperture 234. Step 530 may include soldering, welding, and/or brazing percolation tube 250 to orifice plate 230.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An orifice plate for a shock strut, comprising:
   a metering pin aperture extending through the orifice plate; and
   a percolation aperture extending through the orifice plate,
   wherein the orifice plate comprises an annular geometry defined by a first axially facing peripheral surface, a second axially facing peripheral surface disposed opposite the orifice plate from the first axially facing peripheral surface, an inner diameter surface, and an outer diameter surface,
   wherein the metering pin aperture is defined by the inner diameter surface;
   the metering pin aperture is configured to receive a metering pin;
   a cross-sectional area of the percolation aperture is less than that of a metering area defined between the inner diameter surface and the metering pin;
   the percolation aperture extends from the first axially facing peripheral surface to the second axially facing peripheral surface; and
   the percolation aperture is configured to allow a gas to move from a first chamber of the shock strut to a second chamber of the shock strut in response to the shock strut moving from a retracted position to a deployed position.

2. The orifice plate of claim 1, wherein the orifice plate is configured to separate the first chamber of the shock strut from the second chamber of the shock strut.

3. The orifice plate of claim 1, further comprising a percolation tube extending from the percolation aperture.

4. The orifice plate of claim 1, wherein the percolation aperture is radially offset from the metering pin aperture.

5. The orifice plate of claim 1, wherein the metering pin aperture defines a first flow path and the percolation aperture defines a second flow path, the first flow path is independent from the second flow path.

6. A shock strut, comprising:
   a strut cylinder;
   a strut piston at least partially disposed within the strut cylinder;
   an orifice plate comprising a first axially facing peripheral surface, a second axially facing peripheral surface disposed opposite the orifice plate from the first axially facing peripheral surface, an inner diameter surface, an outer diameter surface, a metering pin aperture, and a percolation aperture, wherein the metering pin aperture is defined by the inner diameter surface;
   a first chamber;
   a second chamber, the orifice plate at least partially separates the first chamber from the second chamber; and
   a metering pin configured to extend through the metering pin aperture;
   wherein the metering pin and the orifice plate define at least one metering groove through which a fluid flows between the first chamber and the second chamber in response to the strut piston translating relative to the strut cylinder;
   a cross-sectional area of the percolation aperture is less than that of a metering area defined between the inner diameter surface of the orifice plate and the metering pin;

the first chamber is in fluidic communication with the second chamber via the percolation aperture;

the percolation aperture extends from the first axially facing peripheral surface to the second axially facing peripheral surface; and the percolation aperture is configured to allow a gas to move from the first chamber to the second chamber in response to the shock strut moving from a retracted position to a deployed position, wherein the first chamber is located opposite the orifice plate from the second chamber.

7. The shock strut of claim 6, wherein the fluid flows through the percolation aperture in response to the strut piston translating relative to the strut cylinder.

8. The shock strut of claim 6, wherein the percolation aperture is disposed in an upper half of the orifice plate in response to the shock strut being in a retracted position.

9. The shock strut of claim 6, wherein the orifice plate comprises an annular geometry.

10. The shock strut of claim 6, wherein the percolation aperture is disposed between the metering pin aperture and the outer diameter surface.

11. The shock strut of claim 6, further comprising a percolation tube extending from the percolation aperture.

12. The shock strut of claim 11, wherein the percolation tube extends into a mixed fluid chamber of the shock strut.

13. The shock strut of claim 6, wherein a cross-sectional area of the percolation aperture is less than that of the at least one metering groove when the shock strut is in a fully extended position.

14. The shock strut of claim 6, wherein a cross-sectional area of the percolation aperture is between five percent and fifty percent of that of the at least one metering groove when the shock strut is in a fully extended position.

15. A method for manufacturing an orifice plate for a shock strut, comprising:

forming a metering pin aperture into the orifice plate; and forming a single percolation aperture into the orifice plate;

wherein the orifice plate comprises a first axially facing peripheral surface, a second axially facing peripheral surface disposed opposite the orifice plate from the first axially facing peripheral surface, an inner diameter surface, and an outer diameter surface, wherein the metering pin aperture is defined by the inner diameter surface;

a cross-sectional area of the percolation aperture is less than that of a metering area defined between an inner diameter surface of the orifice plate and a metering pin, the percolation aperture extends from the first axially facing peripheral surface to the second axially facing peripheral surface; and the percolation aperture is configured to allow a gas to move from a first chamber of the shock strut to a second chamber of the shock strut in response to the shock strut moving from a retracted position to a deployed position.

16. The method of claim 15, further comprising coupling a percolation tube to the orifice plate.

17. The method of claim 15, wherein the orifice plate comprises an annular geometry.

18. The method of claim 17, wherein the percolation aperture is disposed between the metering pin aperture and the outer diameter surface.

* * * * *